US012585632B2

(12) United States Patent
Huang et al.

(10) Patent No.: US 12,585,632 B2
(45) Date of Patent: Mar. 24, 2026

(54) METHOD, DEVICE, AND MEDIUM FOR MANAGING ACTIVITY DATA WITHIN AN APPLICATION

(71) Applicants:Lemon Inc., Grand Cayman (KY); Douyin Vision Co., Ltd., Beijing (CN)

(72) Inventors: Yuxiang Huang, Culver City, CA (US); Jian Lei, Los Angeles, CA (US); Wei Huang, Beijing (CN); Xinhao Zhang, Culver City, CA (US)

(73) Assignees: LEMON INC., Grand Cayman (KY); DOUYIN VISION CO., LTD, Beijing (CN)

( * ) Notice: Subject to any disclaimer, the term of this patent is extended or adjusted under 35 U.S.C. 154(b) by 0 days.

(21) Appl. No.: 18/590,595

(22) Filed: Feb. 28, 2024

(65) Prior Publication Data

US 2024/0289316 A1 Aug. 29, 2024

(30) Foreign Application Priority Data

Feb. 28, 2023 (CN) .......................... 202310183959.2

(51) Int. Cl.
*G06F 16/30* (2019.01)
*G06F 16/22* (2019.01)
*G06F 16/23* (2019.01)

(52) U.S. Cl.
CPC ...... *G06F 16/2272* (2019.01); *G06F 16/2365* (2019.01); *G06F 16/2372* (2019.01)

(58) Field of Classification Search
None
See application file for complete search history.

(56) References Cited

U.S. PATENT DOCUMENTS

| | | | | |
|---|---|---|---|---|
| 10,216,779 B2 * | 2/2019 | Swan | ................ | G06F 16/24578 |
| 10,706,073 B1 * | 7/2020 | Tamkin | ................ | G06F 16/278 |
| 11,537,942 B1 * | 12/2022 | Vogler-Ivashchanka | .................... | |
| | | | | G06N 20/00 |
| 11,748,358 B2 * | 9/2023 | Oliner | ................... | G06F 16/248 |
| | | | | 706/62 |

(Continued)

FOREIGN PATENT DOCUMENTS

| | | |
|---|---|---|
| CN | 108153598 A | 6/2018 |
| CN | 113254523 A | 8/2021 |

(Continued)

OTHER PUBLICATIONS

International Search Report for PCT/CN2024/078399, mailed Apr. 13, 2024, 5 pages.

*Primary Examiner* — Polina G Peach
(74) *Attorney, Agent, or Firm* — Astute IP Law Group

(57) ABSTRACT

The disclosure discloses a method, apparatus, device, medium and product for managing activity data within an application. The method includes: obtaining a queue message in a preset activity data reporting event message queue, and storing activity data corresponding to the queue message into a first preset database of at least one data storage space having a business association with the activity data; and managing the activity data according to duration of the activity data stored in the first preset database and/or a management operation of a user for the activity data; where the first preset database is a key-value database that meets a first preset storage performance standard.

18 Claims, 3 Drawing Sheets

(56) References Cited

U.S. PATENT DOCUMENTS

| | | | |
|---|---|---|---|
| 2016/0226731 A1* | 8/2016 | Maroulis | H04L 69/40 |
| 2017/0200015 A1* | 7/2017 | Gonzalez | H04L 63/1408 |
| 2018/0157725 A1* | 6/2018 | Flynn | H04L 67/535 |
| 2018/0248771 A1* | 8/2018 | Côté | H04L 41/5009 |
| 2018/0293280 A1* | 10/2018 | Svec | G06F 16/289 |
| 2018/0349460 A1* | 12/2018 | Lacerda | G06F 16/273 |
| 2019/0058761 A1* | 2/2019 | Hassan | H04L 67/1012 |
| 2019/0121801 A1* | 4/2019 | Jethwa | G06F 16/243 |
| 2020/0226117 A1* | 7/2020 | Mutalik Desai | G06F 16/2455 |
| 2020/0250007 A1* | 8/2020 | Ke | G06F 9/52 |
| 2020/0272670 A1* | 8/2020 | Vaishnavi | G06F 9/541 |
| 2021/0314342 A1* | 10/2021 | Oberg | H04L 63/20 |
| 2022/0067108 A1 | 3/2022 | Roy et al. | |
| 2022/0382651 A1* | 12/2022 | Lu | G06F 11/1471 |
| 2023/0055677 A1* | 2/2023 | Dhelaria | G06F 16/254 |
| 2023/0138410 A1* | 5/2023 | Le | G06F 16/248 |
| | | | 706/10 |
| 2023/0161795 A1* | 5/2023 | Valt | G06F 16/278 |
| | | | 707/802 |
| 2023/0185640 A1* | 6/2023 | Zhang | G06F 9/542 |
| | | | 719/318 |
| 2023/0247088 A1* | 8/2023 | Kondratiev | H04L 41/5051 |
| | | | 709/201 |
| 2024/0256421 A1* | 8/2024 | Alexander | G06F 17/40 |

FOREIGN PATENT DOCUMENTS

| | | |
|---|---|---|
| CN | 113360299 A | 9/2021 |
| CN | 113722390 A | 11/2021 |

* cited by examiner

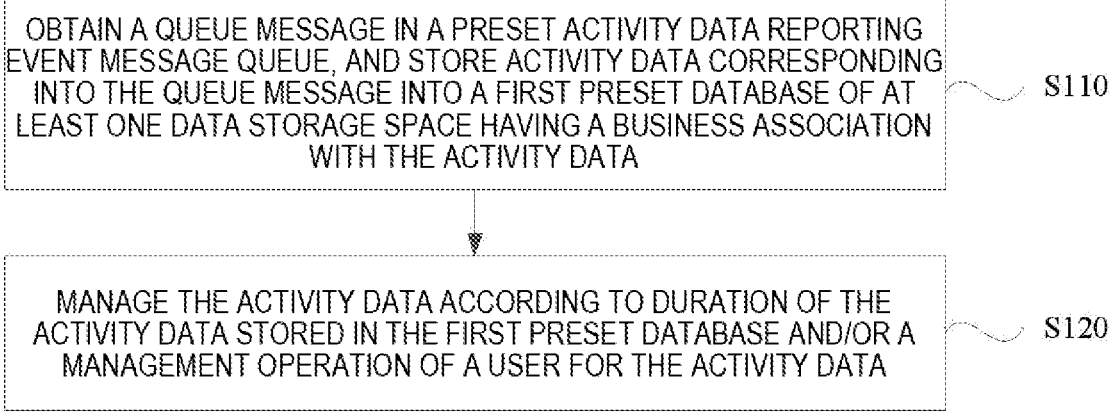

OBTAIN A QUEUE MESSAGE IN A PRESET ACTIVITY DATA REPORTING EVENT MESSAGE QUEUE, AND STORE ACTIVITY DATA CORRESPONDING INTO THE QUEUE MESSAGE INTO A FIRST PRESET DATABASE OF AT LEAST ONE DATA STORAGE SPACE HAVING A BUSINESS ASSOCIATION WITH THE ACTIVITY DATA — S110

MANAGE THE ACTIVITY DATA ACCORDING TO DURATION OF THE ACTIVITY DATA STORED IN THE FIRST PRESET DATABASE AND/OR A MANAGEMENT OPERATION OF A USER FOR THE ACTIVITY DATA — S120

FIG. 1

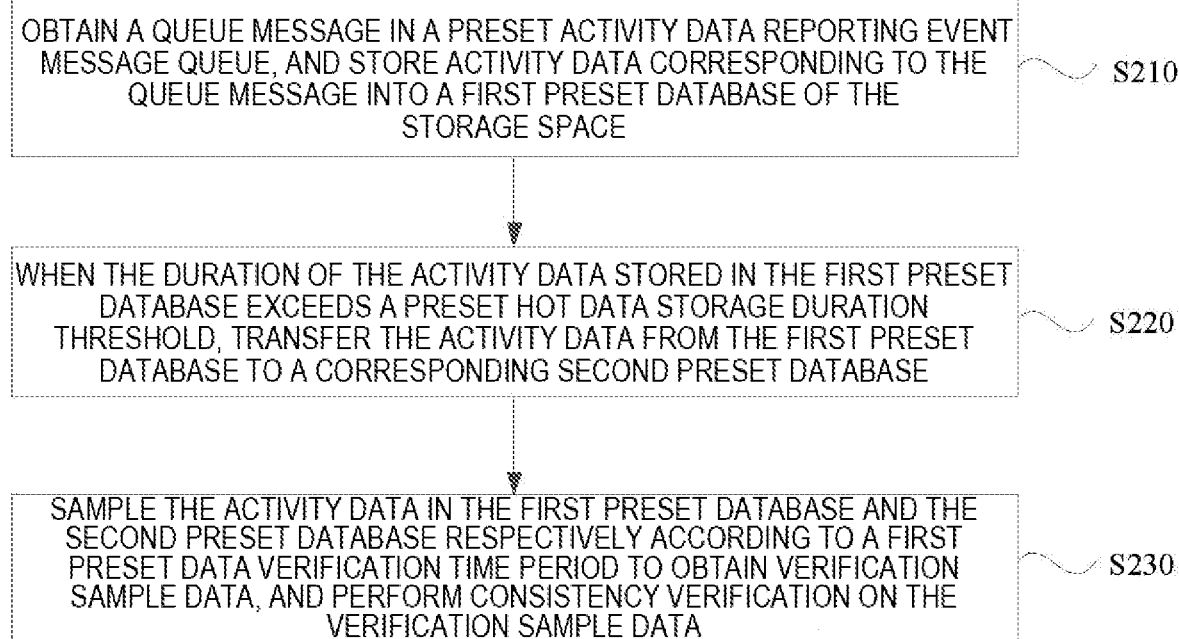

OBTAIN A QUEUE MESSAGE IN A PRESET ACTIVITY DATA REPORTING EVENT MESSAGE QUEUE, AND STORE ACTIVITY DATA CORRESPONDING TO THE QUEUE MESSAGE INTO A FIRST PRESET DATABASE OF THE STORAGE SPACE — S210

WHEN THE DURATION OF THE ACTIVITY DATA STORED IN THE FIRST PRESET DATABASE EXCEEDS A PRESET HOT DATA STORAGE DURATION THRESHOLD, TRANSFER THE ACTIVITY DATA FROM THE FIRST PRESET DATABASE TO A CORRESPONDING SECOND PRESET DATABASE — S220

SAMPLE THE ACTIVITY DATA IN THE FIRST PRESET DATABASE AND THE SECOND PRESET DATABASE RESPECTIVELY ACCORDING TO A FIRST PRESET DATA VERIFICATION TIME PERIOD TO OBTAIN VERIFICATION SAMPLE DATA, AND PERFORM CONSISTENCY VERIFICATION ON THE VERIFICATION SAMPLE DATA — S230

FIG. 2

OBTAIN A QUEUE MESSAGE IN A PRESET ACTIVITY DATA REPORTING EVENT MESSAGE QUEUE, AND STORE ACTIVITY DATA CORRESPONDING TO THE QUEUE MESSAGE INTO A FIRST PRESET DATABASE OF AT LEAST ONE DATA STORAGE SPACE HAVING A BUSINESS ASSOCIATION WITH THE ACTIVITY DATA — S310

WHEN THE DURATION OF THE ACTIVITY DATA STORED IN THE FIRST PRESET DATABASE EXCEEDS A PRESET HOT DATA STORAGE DURATION THRESHOLD, TRANSFER THE ACTIVITY DATA FROM THE FIRST PRESET DATABASE TO A CORRESPONDING SECOND PRESET DATABASE — S320

IN RESPONSE TO AN INSTRUCTION FOR AN ACTIVITY DATA DELETION OPERATION, DELETE THE ACTIVITY DATA TO BE DELETED ASSOCIATED WITH THE ACTIVITY DATA DELETION OPERATION IN A DATA STORAGE SPACE OF A FIRST MICROSERVICE BUSINESS SYSTEM THAT GENERATES THE ACTIVITY DATA TO BE DELETED — S330

SEND A DATA DELETION REQUEST TO A BUSINESS-RELATED MICROSERVICE BUSINESS SYSTEM THAT STORES THE ACTIVITY DATA TO BE DELETED OTHER THAN THE FIRST MICROSERVICE BUSINESS SYSTEM, SO THAT THE BUSINESS-RELATED MICROSERVICE BUSINESS SYSTEM DELETES THE ACTIVITY DATA TO BE DELETED STORED IN THE CORRESPONDING DATA STORAGE SPACE ACCORDING TO THE DATA DELETION REQUEST — S340

SEARCH FOR THE ACTIVITY DATA TO BE DELETED IN INDIVIDUAL DATA STORAGE SPACES, AND VERIFY WHETHER THE ACTIVITY DATA TO BE DELETED IS DELETED FROM EACH OF THE DATA STORAGE SPACES — S350

IN RESPONSE TO AN ACTIVITY DATA QUERY OPERATION INSTRUCTION, QUERY TARGET QUERY ACTIVITY DATA WITHIN A PRESET HISTORICAL DURATION ASSOCIATED WITH AN INITIATION TIME OF THE QUERY INSTRUCTION, FILTER AND RANK THE TARGET QUERY ACTIVITY DATA, AND FEEDBACK THE PROCESSING RESULTS IN PAGES TO THE USER — S360

FIG. 3

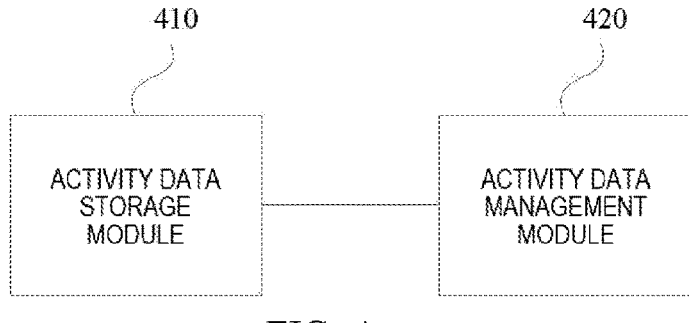

410      420

ACTIVITY DATA STORAGE MODULE

ACTIVITY DATA MANAGEMENT MODULE

FIG. 4

METHOD, DEVICE, AND MEDIUM FOR MANAGING ACTIVITY DATA WITHIN AN APPLICATION

CROSS REFERENCE TO RELATED APPLICATION(S)

The present application claims priority to Chinese Patent Application No. 202310183959.2, filed on Feb. 28, 2023 and entitled "METHOD, APPARATUS, DEVICE, MEDIUM, AND PRODUCT FOR MANAGING ACTIVITY DATA WITHIN AN APPLICATION", the contents of which are hereby incorporated by reference in its entirely.

FIELD

Embodiments of the present disclosure relate to the field of microservices, and more particularly to a method, apparatus, device, medium and product for managing activity data within an application.

BACKGROUND

Under a microservice structure, different application functions within the same application can be implemented through different microservice systems, and corresponding microservice systems manage user activity data within their own microservice systems. If a user manages certain user activity data of his/her own, he/she may only manage the user activity data in the microservice system of the corresponding application function, and cannot synchronously process the user activity data in other microservice systems that store the user activity data. This leads to scattered user activity data management, and each microsystem cannot respond uniformly to operations for user activity data management.

SUMMARY

The present disclosure provides a method, apparatus, device, medium, and product for managing activity data in an application.

In a first aspect, the embodiments of the present disclosure provide a method for managing activity data in an application, the method including:

obtaining a queue message in a preset activity data reporting event message queue, and storing activity data corresponding to the queue message into a first preset database of at least one data storage space having a business association with the activity data; and managing the activity data according to duration of the activity data stored in the first preset database and/or a management operation of a user for the activity data;

wherein the first preset database is a key-value database that meets a first preset storage performance standard.

In a second aspect, the embodiments of the present disclosure also provide an apparatus for managing activity data in an application, the apparatus including:

an activity data storage module configured to obtain a queue message in a preset activity data reporting event message queue, and store activity data corresponding to the queue message in a first preset database of at least one data storage space having a business association with the activity data; and an activity data management module configured to manage the activity data according to a duration of the activity data stored in the first preset database and/or a management operation of a user for the activity data;

wherein the first preset database is a key-value database that meets a first preset storage performance standard.

In a third aspect, the embodiments of the present disclosure also provide an electronic device, the electronic device including:

one or more processors;

a storage apparatus for storing one or more programs, when the one or more programs are executed by the one or more processors, the one or more processors implement the method for managing activity data in an application according to any one of the embodiments of the present disclosure.

In a fourth aspect, the embodiments of the present disclosure further provide a storage medium including computer-executable instructions, when executed by a computer processor, the computer-executable instructions perform the method for managing activity data in an application according to any one of embodiments of the present disclosure.

In a fifth aspect, the embodiments of the present disclosure further provide a computer program product including a computer program, when executed by a processor, the computer program implements the method for managing activity data in an application according to any one of embodiments of the present disclosure.

BRIEF DESCRIPTION OF DRAWINGS

In conjunction with the accompanying drawings and with reference to the following detailed implementations, the above and other features, advantages and aspects of the various embodiments of the present disclosure will become more apparent. Throughout the drawings, the same or similar reference numerals indicate the same or similar elements. It should be understood that the drawings are illustrative and the originals and elements are not necessarily drawn to scale.

FIG. 1 is a schematic flowchart of a method for managing active data in an application provided in an embodiment of the present disclosure.

FIG. 2 is a schematic flowchart of a method for managing active data in an application provided in an embodiment of the present disclosure.

FIG. 3 is a schematic flowchart of a method for managing active data in an application provided in an embodiment of the present disclosure.

FIG. 4 is a structural schematic diagram of an apparatus for managing active data in an application provided in an embodiment of the present disclosure.

DETAILED DESCRIPTION

Figure 5:
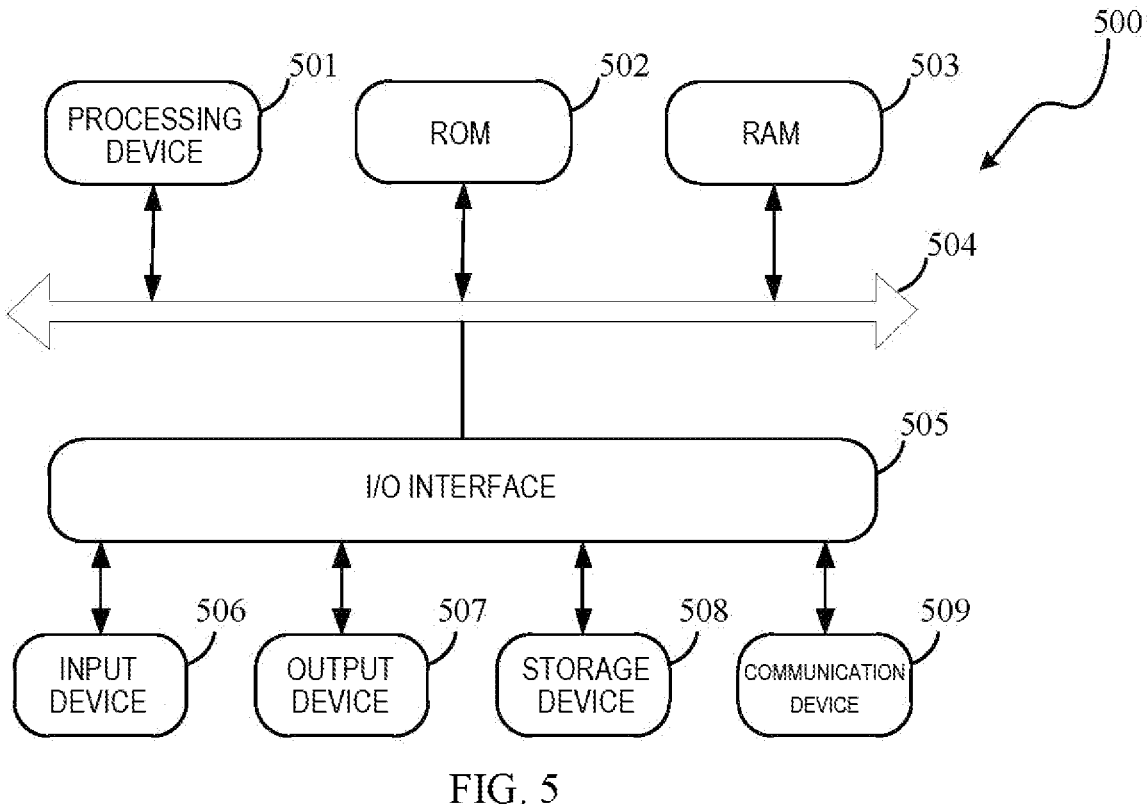
FIG. 5 is a structural schematic diagram of an electronic device provided in an embodiment of the present disclosure.

The following will describe the embodiments of the present disclosure in more detail with reference to the accompanying drawings. Although some embodiments of the present disclosure are shown in the drawings, it should be understood that the present disclosure can be implemented in various forms and should not be construed as limited to the embodiments set forth herein. On the contrary, these embodiments are provided for a more thorough and complete understanding of the present disclosure. It should be understood that the drawings and embodiments of the present disclosure are provided for illustrative purposes only and are not intended to limit the scope of protection of the present disclosure.

It should be understood that the various steps described in the method implementation of this disclosure can be executed in different orders and/or in parallel. In addition, the method implementation can include additional steps and/or the steps as shown may be omitted. The scope of this disclosure is not limited in this regard.

The term "including" and its variations as used herein are non-exclusive inclusion, i.e. "including but not limited to". The term "based on" means "at least partially based on". The term "one embodiment" means "at least one embodiment"; the term "another embodiment" means "at least one additional embodiment"; and the term "some embodiments" means "at least some embodiments". Relevant definitions of other terms will be given in the following description.

It should be noted that the concepts of "first" and "second" mentioned in this disclosure are only used to distinguish different apparatuses, modules, or units, but are not used to limit the order or interdependence of the functions performed by these apparatuses, modules, or units.

It should be noted that the modifications of "one" and "a plurality of" mentioned in this disclosure are illustrative but not limiting. Those skilled in the art should understand that unless otherwise indicated in the context, they should be understood as "one or more".

It will be appreciated that, before using the technical solutions disclosed in the various embodiments of the present disclosure, the user shall be informed of the type, application scope, and application scenario of the personal information involved in this disclosure in an appropriate manner and the user's authorization shall be obtained, in accordance with relevant laws and regulations.

For example, in response to receiving an active request from a user, a prompt message is sent to the user to explicitly prompt the user that the operation requested to be performed will require acquiring and using personal information of the user. Thus, the user can autonomously select whether to provide personal information to software or hardware such as electronic devices, applications, servers, or storage media that perform operations of the disclosed technical solution, based on the prompt message.

As an optional but non-limiting implementation, in response to receiving an active request from the user, prompt information is sent to the user, for example, in the form of a pop-up window, and the pop-up window may present the prompt information in the form of text. In addition, the pop-up window may also carry a selection control for the user to select whether he/she "agrees" or "disagrees" to provide personal information to the electronic device.

It can be understood that the above notification and user authorization process are only illustrative which do not limit the implementation of this disclosure. Other methods that meet relevant laws and regulations can also be applied to the implementation of this disclosure.

It can be understood that data involved in this technical solution (including but not limited to the data itself, acquisition or use of the data) should comply with the requirements of corresponding laws, regulations and relevant provisions.

FIG. 1 is a schematic flowchart of a method for managing active data in an application provided in an embodiment of the present disclosure. The embodiment of the present disclosure is applicable to a scenario in which user activity data in the application are managed, in particular, to a situation in which different business functions within the application are implemented by different microservice structures. The method may be performed by an apparatus for managing active data in an application, the apparatus may be implemented in the form of software and/or hardware, optionally, the apparatus may be provided by an electronic device, and the electronic device may be a mobile terminal, PC or server, etc.

As shown in FIG. 1, the method for managing active data in an application includes:

S110, obtaining a queue message in a preset activity data reporting event message queue, and storing activity data corresponding to the queue message into a first preset database of at least one data storage space having a business association with the activity data.

The preset activity data reporting event message queue is a message queue for receiving user activity data of various business functions within the application reported by the application client, and the message queue is indistinguishable for microservices of various application functions.

Specifically, when a user is active in any application, that is, interacting with any business function in the application, such as watching videos, publishing information or collecting files, etc., the application client will generate activity data related to user activities, and report it to the preset activity data reporting event message queue of the server, so as to apply activity data management microservice to perform subsequent management operations on the user activity data.

In a feasible implementation, the application client may report user activity data obtained each time through an application program interface (API) preset by the application server. After receiving the user activity data reported by the application client through the preset API, the application server will convert the API request event into a Kafka event (i.e., an activity data reporting event) and save it in the preset activity data reporting event message queue, which is convenient for subsequent activity data management microservices to consume.

Furthermore, in the activity data management microservice, a corresponding queue message processing component is provided for the preset activity data reporting event message queue, that is, a Consumer of the queue message. The Consumer may process the messages in the preset activity data reporting event message queue according to an order of the messages, and store activity data corresponding to individual queue messages in a first preset database of at least one data storage space having a business association with the activity data. In a preferred implementation, in order to reduce the number of network requests and reduce the overhead in processing a plurality of requests, the activity data management microservice may process queue messages in batches and then initiate a data write request to the database. For example, if 20 queue events are processed each batch, the queries per second (QPS) of the corresponding activity data management microservice will be reduced by 20 times.

When storing activity data, the activity data is stored into a first preset database of at least one data storage space associated having the business association with activity data. Having business association with activity data may be understood as an association relationship that certain business function generates the activity data, or an association relationship that the activity data will be used in the process of implementing the business function. For example, the video browsing activity data generated while users watching videos is activity data generated in the business function providing the video data, or it can be activity data referenced and used in the process of implementing the content recommendation function in the content recommendation business function. Generally, one data storage space is configured corresponding to each business function (an independent microservice system) to store user activity data generated in the process of implementing the business function microservice. Therefore, when storing activity data, the activity data can be stored in the first preset database of the corresponding data storage space. The first preset database can be a key-value database that meets a first preset storage performance standard, such as a distributed key-value storage system that can support millions of QPS and supports the Redis protocol, which is a highly available, low-latency, and highly scalable storage database.

S120, managing the activity data according to duration of the activity data stored in the first preset database and/or a management operation of a user for the activity data.

In the process of managing activity data, data management is performed according to the duration of the activity data stored in the corresponding first preset database and the management operation of the user for the activity data. On one hand, user activity data generated in various business functions are managed in accordance with a unified data management rule, and on the other hand, the users are provided with functional options for activity data management, so that the users may independently processes activity data when using the application.

The duration of the activity data stored in the corresponding first preset database is considered for saving costs of data storage, and hot data and cold data are distinguished according to the time that the activity data has been stored, that is, hot data is data with short storage time and large read access volume in the database, and cold data is data with long storage time and small read access volume in the database. Therefore, storage management can be carried out separately according to the characteristics of hot and cold data.

The management operations of the user can be operations such as data query, deletion, transfer and collection, or sharing, etc. Users may trigger corresponding data management operations according to their management needs for activity data, thereby realizing the management of activity data. Specifically, functional controls for management operations for various activity data can be provided in an interactive interface of the application, so as to provide users with an entrance to management operations for activity data.

In an optional implementation, in order to ensure the integrity of activity data storage, upon failure to store the activity data into the first preset database or after storing a preset quantity of the activity data, offline data storage management is started, and the activity data is stored as new data into an offline data storage table; then, the data in the offline data storage table is stored into the first preset database according to a preset data storage period. That is, the activity data is supplemented and stored to avoid that some data is not stored in the corresponding first preset database.

In addition, a data verification time period is set. According to this period, consistency verification is performed on the activity data stored in various data storage spaces, and consistency verification is performed on the activity data associated with all queue messages in the preset activity data reporting event message queue and the activity data stored in individual data storage spaces, so as to further ensure the accuracy and consistency of data storage. The purpose of performing consistency verification on the activity data stored in various data storage spaces is to determine whether the activity data simultaneously stored in a plurality of data storage spaces is the same. The purpose of performing consistency verification on the activity data associated with all queue messages in the preset activity data reporting event message queue and the activity data stored in various data storage spaces is to determine whether the user activity data reported by client is stored in the corresponding data storage space database, so as to avoid omissions.

Preferably, in order to support the management of various user activity data under the microservice structure, the activity data management microservice in this embodiment is provided with a plurality of storage types of databases, to correspond to user activities under different scenarios respectively, such as relational databases as Redis, MySQL, etc., key-value databases, and distributed storage databases. In addition, if some of the user activity data cannot be directly stored in the activity data management microservice system, the system can also interact directly with a system having a function of storing corresponding activity data in the form of remote procedure call (RPC call) to store the corresponding type of activity data.

In the technical solution of the present disclosure, a queue message in the preset activity data reporting event message queue is obtained, and activity data corresponding to the queue message is stored into a first preset database of at least one data storage space having a business association with the activity data; and the activity data is managed according to the duration of the activity data stored in the first preset database and/or a management operation of a user for the activity data; the first preset database is a key-value database that meets a first preset storage performance standard. That is, the activity data queue messages of various business functions in the preset activity data reporting event message queue are managed uniformly by using a unified activity data management rule. The technical solutions in the embodiments of the present disclosure solve the problem of dispersed and inconsistent activity data management among microservices of different application functions in the application, and can manage various user activity data generated by microservice systems of different businesses according to the unified rule through a microservice structure, so that the storage management for activity data has consistency and uniformity.

FIG. 2 is a schematic flowchart of a method for managing active data in an application provided in an embodiment of the present disclosure. This method and the method for managing activity data in an application provided by contents of the above-described embodiment belong to the same inventive concept. This method further describes a process of performing a data management operation based on storage duration of the activity data, and the method may be performed by an apparatus for managing active data in an application. The apparatus may be implemented in the form of software and/or hardware, optionally, the apparatus may be implemented by an electronic device, and the electronic device may be a mobile terminal, PC or server.

As shown in FIG. 2, the method for managing active data in an application includes:

S210, obtaining a queue message in a preset activity data reporting event message queue, and storing activity data corresponding to the queue message into a first preset database of at least one data storage space having a business association with the activity data.

The first preset database is a key-value database that meets a first preset storage performance standard. A database having the first preset storage performance can withstand high QPS, ensuring high concurrency of user activity data access and query operations.

It can be understood that in this step, the latest generated activity data is stored in the first preset database of the corresponding data storage space.

S220, when the duration of the activity data stored in the first preset database exceeds a preset hot data storage duration threshold, transferring the activity data from the first preset database to a corresponding second preset database.

Generally, activity data is stored in the database after being generated. The longer the storage time, the less likely it is to be accessed and queried. If the activity data is all stored in the key-value database all the time, it will cause greater pressure on the storage of active data, and higher costs in data storage will be generated, which can only support the storage of activity data within a short time range.

In the present embodiment, the data is divided into hot data and cold data according to the duration of the activity data stored in the first preset database. For example, the data stored within the last 7 days from the current time is taken as hot data, and data that has been generated for 7-180 days as the activity data is taken as cold data. In this step, the activity data that has been changed from hot data to cold data can be stored in the second preset database to reduce the cost of data storage. The second preset database is a distributed table storage database that meets a second preset storage performance standard, thus the requirements of a large quantity of data storage can be met. Compared with the previous activity data storage scheme, the activity data management scheme of the present embodiment may store more and longer user historical activity data.

Specifically, in the process of data migration between hot and cold storage, firstly, a condition for triggering data migration is monitored, for example, the duration of active data stored in each first preset database is monitored every day. When the corresponding duration exceeds a preset hot data storage duration threshold, the data storage service function module may generate a Kafka queue event (Kafka event) for data migration. Alternatively, when a certain quantity of newly generated user activity data is stored in the first preset databases every day, monitoring of the duration of active data stored in each first preset database is started. Then, the target activity data that needs to be migrated can be determined through the Kafka event. Corresponding data migration script is provided in each data storage space. After obtaining the Kafka event, the Kafka event will be consumed, and the target activity data of the first preset database that needs to be migrated will be read out according to the key value and then written into the second preset database.

S230, sampling the activity data in the first preset database and the second preset database respectively according to a first preset data verification time period to obtain verification sample data; and performing consistency verification on the verification sample data.

In particular, in the present embodiment, after each data migration, data verification is further performed on the hot data source and cold data source, and the consistency of the hot data source and the cold data source is determined. If the hot data source and the cold data source are not in consistent with each other, the data migration will be performed again.

It can be understood that when the hot data is migrated from the first preset database to the second preset database, the migrated data will expire in the first preset database and will not be retained for long time. The consistency verification is carried out before the migrated hot data expired in the first preset database. By using a data source sampling method, for data sources such as the daily activity table of the application, user click records, etc., the data content in the first preset database and the second preset database are respectively read based on the user identification information (user id), to determine whether the read results are consistent.

In the technical solution of the present disclosure, a queue message in the preset activity data reporting event message queue is obtained, and activity data corresponding to the queue message is stored into a first preset database of at least one data storage space having a business association with the activity data; and the activity data is divided into cold data and hot data according to the duration of the activity data stored in the first preset database, and cold data is migrated to the corresponding second preset database, thus, a larger quantity of user activity data can be stored and cost of data storage is reduced. That is, the activity data queue messages of various business functions in the preset activity data reporting event message queue are managed uniformly by using a unified activity data management rule. The technical solutions in the embodiments of the present disclosure solve the problem of dispersed and inconsistent activity data management among microservices of different application functions in the application, and can manage various user activity data generated by microservice systems of different businesses according to the unified rule through a microservice structure, so that the storage management for activity data has consistency and uniformity.

FIG. 3 is a schematic flowchart of a method for managing active data in an application provided in an embodiment of the present disclosure, and this method and the method for managing activity data in an application provided by contents of the above-described embodiment belong to the same inventive concept. This method further describes a process of performing data management operation based on a management operation instruction of a user for the activity data, and the method may be performed by an apparatus for managing active data in an application. The apparatus may be implemented in the form of software and/or hardware, optionally, the apparatus may be implemented by an electronic device, and the electronic device may be a mobile terminal, PC or server.

As shown in FIG. 3, the method for managing active data in an application includes:

S310, obtaining a queue message in a preset activity data reporting event message queue, and storing activity data corresponding to the queue message into a first preset database of at least one data storage space having a business association with the activity data.

S320, when the duration of the activity data stored in the first preset database exceeds a preset hot data storage duration threshold, transferring the activity data from the first preset database to a corresponding second preset database.

S330, in response to an instruction for an activity data deletion operation, deleting the activity data to be deleted associated with the activity data deletion operation in a data storage space of a first microservice business system that generates the activity data to be deleted.

Specifically, functional controls for management operations for various activity data can be set in an interactive interface of the application, so as to provide the user with an entrance of the management operation for activity data. For example, the management operations of the user may include operations such as data query, deletion, transfer and collection, or sharing, etc. The user may trigger a corresponding data management operation according to their management requirements for activity data, thereby realizing the management for activity data.

When the user triggers the activity data deletion function control at the application client, the activity data management microservice may obtain corresponding instruction for activity data deletion operation. The instruction for activity data deletion operation includes information about the activity data to be deleted, and the activity data to be deleted is the target deletion data object.

In the prior art, different business functions within the application are implemented through independent microservice structures, and the management for user activity data in individual microservice structures is also independent. When a user deletes certain activity data, he/she usually can only delete the activity data stored in the data storage space of the microservice structure that generates the activity data, but cannot delete the activity data stored in the data storage spaces of the microservice structures with other business functions. This will affect the user experience and is not conducive to the protection of user privacy.

In the present embodiment, in order to protect the data privacy of the user, ensure that all the target deletion data objects in all the databases storing the target deletion data objects are deleted, and support deleting all the activity data with one click by the user considering the large quantity of user activity data stored (such as during a maximum storage time of six months, the user activity data may correspond to an order of 100 k), the activity data deletion operation is designed as an asynchronous operation. First, the activity data to be deleted stored in a data storage space of the first microservice business system that generates the activity data to be deleted is deleted. It should be noted that the activity data to be deleted stored in the data storage space of the first microservice business system may be stored only in the first preset database or the second preset database, or may be stored simultaneously in both the first preset database and the second preset database. Therefore, the order of the steps S330 and S320 are not strictly limited.

Further, step S340 is performed asynchronously with step 330.

S340, sending a data deletion request to a business-related microservice business system that stores the activity data to be deleted other than the first microservice business system, so that the business-related microservice business system deletes the activity data to be deleted stored in the corresponding data storage space according to the data deletion request.

The activity data to be deleted stored in the data storage spaces of the business-associated microservice business systems stored with activity data to be deleted the other than the first microservice business system can be deleted through step S340.

Specifically, in the process of implementing data deletion in steps S330 and S340, when the user triggers the deletion operation, the client will upload a data deletion instruction through the corresponding API service. The application activity data management microservice receives this data deletion instruction through the API service and generates a deletion event kafka event. For a delete all request, during the consumption of the kafka event, the data deletion component will read all the activity data to be deleted of a certain business category of the user in batches from the hot and cold databases of individual microservice business systems and delete it. For a batch delete request, the data deletion component will directly find the data to be deleted in the hot and cold databases of individual microservice business systems and delete it.

In addition, for other related data within the application, such as related business data generated based on the deleted user activity data, a data retention function component is provided to be responsible for deleting related data. After receiving the data deletion request, the data retention function component will create a related data deletion task, and the related data deletion task will be executed by a preset data deletion script, and other business parties that may store related data and may be accessed previously will be notified to delete user activity data through RPC calls.

S350, searching for the activity data to be deleted in individual data storage spaces, and verifying whether the activity data to be deleted is deleted from each of the data storage spaces.

In this step, the deletion of user activity data can be verified. After the data to be deleted stored in individual microservice business systems is deleted, a confirmation may be sent to individual microservice business systems through RPC call at a preset time interval to confirm whether the deleted activity data has been deleted, which further ensures that all user activity data that needs to be deleted is deleted. If it is confirmed that activity data that should be deleted is still stored in some microservice business systems, the corresponding activity data deletion process will be performed again.

S360, in response to an activity data query operation instruction, querying target query activity data within a preset historical duration associated with an initiation time of the query instruction, filtering and ranking the target query activity data, and feeding back the processing results in pages to the user.

In this embodiment, considering the characteristics of the active data management microservice in which the quantity of data written to the system as a whole is much larger than the quantity of data read, since the read QPS is not high, corresponding pagination request can be provided, and users may set the quantity of data that can be displayed per page in the data feedback interface. Whenever a user initiates an active data read request, the data storage service functional component will read out data of several adjacent days from the time when the read request is initiated (query instruction initiation time), and perform in-memory filtering and ranking (such as displaying in reverse time order), and feed back to the user who issues the active data query operation instruction based on the data quantity set in the user's pagination request.

It should be noted here that there is no order limitation among S360 and S320, S330, S340, and S350, and the execution is determined based on the data management operation request sent by the user.

In the technical solutions of the embodiments of the present disclosure, a queue message in the preset activity data reporting event message queue is obtained, and activity data corresponding to the queue message is stored in a first preset database of at least one data storage space having a business association with the activity data; the activity data is managed according to the duration of the activity data stored in the first preset database, so that the data cost is reduced and a larger quantity of user activity data is stored, and the management of activity data, especially the deletion of activity data, is implemented in response to the data management operation. By adopting asynchronous operations, the deletion of data to be deleted simultaneously stored in a plurality of microservice business systems can be ensured, which better protect the data privacy of the users. When responding to the user data query instruction, query data can be fed back to the user in a paginated form, facilitating the user to perform data browsing. Thus, the technical solutions in the embodiments of the present disclosure solve the problem of dispersed and inconsistent activity data management among microservices of different application functions in the application, and can manage various user activity data generated by microservice systems of different businesses according to the unified rule through a microservice structure, so that the storage management for activity data has consistency and uniformity.

FIG. 4 is a structural schematic diagram of an apparatus for managing active data in an application provided in an embodiment of the present disclosure. The apparatus is applicable to a scenario in which user activity data in the application are managed, in particular, to a situation in which different business functions within the application are implemented by different microservice structures. The apparatus for managing active data in an application may be implemented in the form of software and/or hardware, may be provided in an electronic device, and the electronic device may be a mobile terminal, PC or server, etc.

As shown in FIG. 4, the apparatus for managing active data in an application includes: an activity data storage module 410 and an activity data management module 420.

The activity data storage module 410 configured to obtain a queue message in a preset activity data reporting event message queue, and store activity data corresponding to the queue message in a first preset database of at least one data storage space having a business association with the activity data; and the activity data management module 420 configured to manage the activity data according to duration of the activity data stored in the first preset database and/or a management operation of a user for the activity data; wherein the first preset database is a key-value database that meets a first preset storage performance standard.

In the embodiments of the present disclosure, a queue message in the preset activity data reporting event message queue is obtained, and activity data corresponding to the queue message is stored into a first preset database of at least one data storage space having a business association with the activity data; the activity data is managed according to the duration of the activity data stored in the first preset database and/or a management operation of a user for the activity data; the first preset database is a key-value database that meets a first preset storage performance standard. That is, the activity data queue messages of various business functions in the preset activity data reporting event message queue are managed uniformly by using a unified activity data management rule. The technical solutions in the embodiments of the present disclosure solve the problem of dispersed and inconsistent activity data management among microservices of different application functions in the application, and can manage various user activity data generated by microservice systems of different businesses according to the unified rule through a microservice structure, so that the storage management for activity data has consistency and uniformity.

On the basis of any optional embodiment of the present disclosure, optionally, the activity data management module 420 is specifically configured to: when the duration of the activity data stored in the first preset database exceeds a preset hot data storage duration threshold, transfer the activity data from the first preset database to a corresponding second preset database; wherein the second preset database is a distributed table storage database that meets a second preset storage performance standard.

On the basis of any optional embodiment of the present disclosure, optionally, the activity data management module 420 is further configured to: upon failure to store the activity data into the first preset database or after storing a preset quantity of the activity data, store the activity data as new added data into an offline data storage table; and store data in the offline data storage table into the first preset database according to a preset data storage period.

On the basis of any optional embodiment of the present disclosure, optionally, the activity data management module 420 is further configured to: when the management operation for the activity data is an activity data deletion operation, delete activity data to be deleted associated with the activity data deletion operation in a data storage space of a first microservice business system that generates the activity data to be deleted; and send a data deletion request to a business-related microservice business system that stores the activity data to be deleted other than the first microservice business system, so that the business-related microservice business system deletes the activity data to be deleted stored in the corresponding data storage space according to the data deletion request.

On the basis of any optional embodiment of the present disclosure, optionally, the activity data management module 420 is further configured to: sample the activity data in the first preset database and the second preset database respectively according to a first preset data verification time period to obtain verification sample data; and perform consistency verification on the verification sample data.

On the basis of any optional embodiment of the present disclosure, optionally, the activity data management module 420 is further configured to: after performing the activity data deletion operation, searching for the activity data to be deleted in individual data storage spaces, and verifying whether the activity data to be deleted is deleted from each of the data storage spaces.

On the basis of any optional embodiment of the present disclosure, optionally, the activity data management module 420 is further configured to: perform consistency verification on the activity data stored in individual data storage spaces according to a second preset data verification time period, and perform consistency verification on the activity data associated with all queue messages in the preset activity data reporting event message queue and the activity data stored in individual data storage spaces.

The apparatus for managing active data in an application provided in the embodiments of the present disclosure may perform the method for managing active data in an application provided in any embodiments of present disclosure, which has the corresponding functional modules and beneficial effects of the method.

It is worth noting that the various units and modules included in the above apparatus are only divided according to functional logic, however the present application is are not limited to the above division, as long as the corresponding functions can be realized; in addition, the specific names of each functional unit are only used for the sake of mutual distinction instead of limiting the scope of protection of the embodiments of the present disclosures.

FIG. 5 is a structural schematic diagram of an electronic device provided in an embodiment of the present disclosure. Referring to FIG. 5 below, it is a structural schematic diagram of an electronic device (such as the terminal device or server in FIG. 5) suitable for implementing the embodiment of the present disclosure. The terminal device 500 in the embodiment of the present disclosure may include but is not limited to mobile terminals such as mobile phones, laptops, digital broadcast receivers, PDAs (Personal Digital Assistants), PADs (tablet computers), PMPs (portable multimedia players), car-mounted terminals (such as car navigation terminals), etc. and fixed terminals such as digital televisions (TV), desktop computers, etc. The electronic device shown in FIG. 5 is only an example and should not bring any limitation on the functionality and scope of use of the embodiment of the present disclosure.

As shown in FIG. 5, the electronic device 500 may include a processing device (such as a central processing unit, graphics processing unit, etc.) 501, which may perform various appropriate actions and processes based on programs stored in Read-Only Memory (ROM) 502 or loaded from storage device 508 into Random Access Memory (RAM) 503. In the RAM 503, various programs and data necessary for the operation of the electronic device 500 are also stored. The processing device 501, ROM 502, and RAM 503 are connected to each other through a bus 504. An Input/Output I/O interface 505 is also connected to the bus 504.

Typically, the following devices can be connected to I/O interface 505: input devices 506 including, for example, touch screens, touchpads, keyboards, mice, cameras, microphones, accelerometers, gyroscopes, etc.; output devices 507 including liquid crystal displays (LCDs), speakers, vibrators, etc.; storage devices 508 including magnetic tapes, hard disks, etc.; and a communication device 509. The communication device 509 may allow the electronic device 500 to communicate with other devices wirelessly or wirelessly to exchange data. Although FIG. 5 shows an electronic device 500 with a plurality of devices, it shall be understood that it is not required to implement or have all of the devices shown. More or fewer devices can be implemented or provided instead.

In particular, according to embodiments of the present disclosure, the process described above with reference to the flowchart can be implemented as a computer software program. For example, an embodiment of the present disclosure includes a computer program product that includes a computer program carried on a non-transitory computer-readable medium, where the computer program includes program code for performing the method shown in the flowchart. In such an embodiment, the computer program can be downloaded and installed from a network through the communication device 509, or installed from the storage device 508, or installed from the ROM 502. When the computer program is executed by the processing device 501, the above functions defined in the method of the embodiment of the present disclosure are performed.

The names of the messages or information exchanged between a plurality of devices in the embodiment of the present disclosure are for illustrative purposes only and are not intended to limit the scope of these messages or information.

The electronic device provided in this embodiment of the present disclosure and the method for managing activity data in an application provided in the above embodiments belongs to the invention idea. Technical details that are not described in detail in this embodiment can be found in the above embodiments, and this embodiment has the same beneficial effect as the above embodiments.

An embodiment of the present disclosure provides a computer storage medium on which a computer program is stored, when being executed by a processor, the program implements the method for managing activity data in an application provided in the above embodiments.

It should be noted that the computer-readable medium described above can be a computer-readable signal medium or a computer-readable storage medium, or any combination thereof. The computer-readable storage medium can be, for example, but not limited to, an electrical, magnetic, optical, electromagnetic, infrared, or semiconductor system, apparatus, or device, or any combination thereof. Specific examples of computer-readable storage media may include but are not limited to: an electrical connection with one or more wires, a portable computer disk, a hard disk, random access memory (RAM), read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium containing or storing a program that can be used by an instruction execution system, apparatus, or device, or can be used in combination with an instruction execution system, apparatus, or device. In the present disclosure, a computer-readable signal medium can include a data signal propagated in baseband or as part of a carrier wave, which carries computer-readable program code therein. Such propagated data signals may take many forms, including but not limited to electromagnetic signals, optical signals, or any suitable combination thereof. A computer-readable signal medium may also be any computer-readable medium other than a computer-readable storage medium, which can send, propagate, or transmit programs for use by or in conjunction with instruction execution systems, apparatus, or devices. The program code contained on the computer-readable medium may be transmitted using any suitable medium, including but not limited to: wires, optical cables, RF (radio frequency), etc., or any suitable combination thereof.

In some embodiments, clients and servers can communicate using any currently known or future developed network protocol such as HTTP (Hypertext Transfer Protocol), and can be interconnected with any form or medium of digital data communication (such as communication networks). Examples of communication networks include local area networks ("LANs"), wide area networks ("WANs"), internetworks (such as the Internet), and end-to-end networks (such as ad hoc end-to-end networks), as well as any currently known or future developed networks.

The computer-readable medium can be included in the electronic device, or it can exist alone without being assembled into the electronic device.

The above-mentioned computer-readable medium carries one or more programs, and when the above-mentioned one or more programs are executed by the electronic device, the electronic device:

obtain a queue message in a preset activity data reporting event message queue, and store activity data corresponding to the queue message into a first preset database of at least one data storage space having a business association with the activity data; and manage the activity data according to duration of the activity data stored in the first preset database and/or a management operation of a user for the activity data;

wherein the first preset database is a key-value database that meets a first preset storage performance standard.

Computer program codes for performing the operations of the present disclosure may be written in one or more programming languages or a combination thereof, including but not limited to Object Oriented programming languages—such as Java, Smalltalk, C++, and also conventional procedural programming languages—such as "C" or similar programming languages. The program code may be executed entirely on the user's computer, partially executed on the user's computer, executed as a standalone software package, partially executed on the user's computer and partially on a remote computer, or entirely on a remote computer or server. In the case of involving a remote computer, the remote computer may be any kind of network-including local area network (LAN) or wide area network (WAN)—connected to the user's computer, or may be connected to an external computer (e.g., through an Internet service provider to connect via the Internet).

The flowcharts and block diagrams in the accompanying drawings illustrate the architecture, functions, and operations of possible implementations of the system, method, and computer program product according to various embodiments of the present disclosure. In this regard, each block in a flowchart or block diagram may represent a module, program segment, or portion of code that contains one or more executable instructions for implementing a specified logical function. It should also be noted that in some alternative implementations, the functions marked in the blocks may occur in a different order than those marked in the drawings. For example, two consecutive blocks may actually be executed in parallel, or they may sometimes be executed in reverse order, depending on the function involved. It should also be noted that each block in the block diagrams and/or flowcharts, as well as combinations of blocks in the block diagrams and/or flowcharts, may be implemented using a dedicated hardware-based system that performs the specified function or operations, or may be implemented using a combination of dedicated hardware and computer instructions.

The units described in the embodiments of the present disclosure may be implemented by means of software or hardware, and the name of the unit does not constitute a limitation on the unit itself in a certain case, for example, a first obtaining unit may also be described as "a unit for obtaining at least two internet protocol addresses".

The functions described herein above can be performed at least in part by one or more hardware logic components. For example, without limitation, exemplary types of hardware logic components that may be used include: Field Programmable Gate Arrays (FPGAs), Application Specific Integrated Circuits (ASICs), Application Specific Standard Parts (ASSPs), System on Chip (SOCs), Complex Programmable Logic Devices (CPLDs), and so on.

In the context of this disclosure, a machine-readable medium can be a tangible medium that may contain or store programs for use by or in conjunction with instruction execution systems, apparatuses, or devices. A machine-readable medium may be a machine-readable signal medium or a machine-readable storage medium. A machine-readable medium may include, but are not limited to, electronic, magnetic, optical, electromagnetic, infrared, or semiconductor systems, apparatuses, or devices, or any suitable combination thereof. Specific examples of the machine-readable storage medium may include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination thereof.

Embodiments of the present disclosure also provides a computer program product, when executed by a processor, the computer program implements the method for managing activity data in an application according to any one of embodiments of the present disclosure.

During implement the computer program product, computer program codes for performing the operations of the present disclosure may be written in one or more programming languages or a combination thereof, including Object Oriented programming languages, such as Java, Smalltalk, C++, and also conventional procedural programming languages, such as "C" or similar programming languages. The program code may be executed entirely on the user's computer, partially executed on the user's computer, executed as a standalone software package, partially executed on the user's computer and partially on a remote computer, or entirely on a remote computer or server. In the case of involving a remote computer, the remote computer may be any kind of network—including local area network (LAN) or wide area network (WAN)—connected to the user's computer, or may be connected to an external computer (e.g., through an Internet service provider to connect via the Internet).

According to one or more embodiments of the present disclosure, [Example 1] provides a method for managing activity data in an application, the method including: obtaining a queue message in a preset activity data reporting event message queue, and storing activity data corresponding to the queue message into a first preset database of at least one data storage space having a business association with the activity data; and managing the activity data according to duration of the activity data stored in the first preset database and/or a management operation of a user for the activity data; wherein the first preset database is a key-value database that meets a first preset storage performance standard.

According to one or more embodiments of the present disclosure, [Example 2] provides a method for managing activity data in an application, further including: in some optional implementations, managing the activity data according to duration of the activity data stored in the first preset database, including: when the duration of the activity data stored in the first preset database exceeds a preset hot data storage duration threshold, transferring the activity data from the first preset database to a corresponding second preset database; wherein the second preset database is a distributed table storage database that meets a second preset storage performance standard.

According to one or more embodiments of the present disclosure, [Example 3] provides a method for managing activity data in an application, including: in some optional implementations, upon failure to store the activity data into the first preset database or after storing a preset quantity of the activity data, the method further including: storing the activity data as new added data into an offline data storage table; and storing data in the offline data storage table into the first preset database according to a preset data storage period.

According to one or more embodiments of the present disclosure, [Example 4] provides a method for managing activity data in an application, further including: in some optional implementations, the managing the activity data according to a management operation of a user for the activity data, including: when the management operation for the activity data is an activity data deletion operation, deleting activity data to be deleted associated with the activity data deletion operation in a data storage space of a first microservice business system that generates the activity data to be deleted; and sending a data deletion request to a business-related microservice business system that stores the activity data to be deleted other than the first microservice business system, so that the business-related microservice business system deletes the activity data to be deleted stored in the corresponding data storage space according to the data deletion request.

According to one or more embodiments of the present disclosure, [Example 5] provides a method for managing activity data in an application, further including: in an optional implementation, the method further includes: sampling the activity data in the first preset database and the second preset database respectively according to a first preset data verification time period to obtain verification sample data; and performing consistency verification on the verification sample data.

According to one or more embodiments of the present disclosure, [Example 6] provides a method for managing activity data in an application, further including: in some optional implementations, after performing the activity data deletion operation, the method further includes: searching for the activity data to be deleted in individual data storage spaces, and verifying whether the activity data to be deleted is deleted from each of the data storage spaces.

According to one or more embodiments of the present disclosure, [Example 7] provides a method for managing activity data in an application, further including: in an optional implementation, the method further includes: performing consistency verification on the activity data stored in individual data storage spaces according to a second preset data verification time period, and performing consistency verification on the activity data associated with all queue messages in the preset activity data reporting event message queue and the activity data stored in individual data storage spaces.

According to one or more embodiments of the present disclosure, [Example 8] provides an apparatus for managing activity data in an application, including: an activity data storage module configured to obtain a queue message in a preset activity data reporting event message queue, and store activity data corresponding to the queue message into a first preset database of at least one data storage space having a business association with the activity data; and an activity data management module configured to manage the activity data according to duration of the activity data stored in the first preset database and/or a management operation of a user for the activity data; wherein the first preset database is a key-value database that meets a first preset storage performance standard.

According to one or more embodiments of the present disclosure, [Example 9] provides an apparatus for managing activity data in an application, further including: in an optional implementation, the activity data management module is specifically configured to: when the duration of the activity data stored in the first preset database exceeds a preset hot data storage duration threshold, transfer the activity data from the first preset database to a corresponding second preset database; wherein the second preset database is a distributed table storage database that meets a second preset storage performance standard.

According to one or more embodiments of the present disclosure, [Example 10] provides an apparatus for managing activity data in an application, further including: in an optional implementation, the activity data management module is also configured to: upon failure to store the activity data into the first preset database or after storing a preset quantity of the activity data, store the activity data as new added data into an offline data storage table; and store data in the offline data storage table into the first preset database according to a preset data storage period.

According to one or more embodiments of the present disclosure, [Example 11] provides an apparatus for managing activity data in an application, further including: in an optional implementation, the activity data management module is also configured to: when the management operation for the activity data is an activity data deletion operation, delete activity data to be deleted associated with the activity data deletion operation in a data storage space of a first microservice business system that generates the activity data to be deleted; and send a data deletion request to a business-related microservice business system that stores the activity data to be deleted other than the first microservice business system, so that the business-related microservice business system deletes the activity data to be deleted stored in the corresponding data storage space according to the data deletion request.

According to one or more embodiments of the present disclosure, [Example 12] provides an apparatus for managing activity data in an application, further including: in an optional implementation, the activity data management module is also configured to: sample the activity data in the first preset database and the second preset database respectively according to a first preset data verification time period to obtain verification sample data; and perform consistency verification on the verification sample data.

According to one or more embodiments of the present disclosure, [Example 13] provides an apparatus for managing activity data in an application, further including: in an optional implementation, the activity data management module is also configured to: after performing the activity data deletion operation, search for the activity data to be deleted in individual data storage spaces, and verifying whether the activity data to be deleted is deleted from each of the data storage spaces.

According to one or more embodiments of the present disclosure, [Example 14] provides an apparatus for managing activity data in an application, further including: in an optional implementation, the activity data management module is also configured to: perform consistency verification on the activity data stored in individual data storage spaces according to a second preset data verification time period, and perform consistency verification on the activity data associated with all queue messages in the preset activity data reporting event message queue and the activity data stored in individual data storage spaces.

The above description is only embodiments of this disclosure and an explanation of the technical principles used. Those skilled in the art should understand that the scope of the disclosure involved in this disclosure is not limited to technical solutions composed of specific combinations of the above technical features, but should also covers other technical solutions formed by arbitrary combinations of the above technical features or their equivalent features without departing from the above disclosure concept. For example, technical solutions formed by replacing the above features with (but not limited to) technical features with similar functions disclosed in this disclosure.

In addition, although a plurality of operations are depicted in a specific order, this should not be understood as requiring these operations to be performed in the specific order shown or in a sequential order. In certain environments, multitasking and parallel processing may be advantageous. Similarly, although a plurality of implementation details are included in the above discussion, these should not be construed as limiting the scope of the present disclosure. Some features described in the context of individual embodiments can also be implemented in combination in a single embodiment. Conversely, a plurality of features described in the context of a single embodiment can also be implemented in a plurality of embodiments separately or in any suitable sub-combination.

Although the subject matter has been described in language specific to structural features and/or methodological actions, it should be understood that the subject matter defined in the appended claims is not necessarily limited to the specific features or actions described above.

On the contrary, the specific features and actions described above are merely example forms of implementing the claims.

We claim:

1. A method for managing activity data in an application, comprising:

obtaining, through a queue message processing component disposed in a plurality of microservice systems, a queue message in a preset activity data reporting event message queue from the plurality of microservice systems under a microservice structure, and storing activity data corresponding to the queue message into a first preset database of at least one data storage space having a business association with the activity data, the queue message including activity data from different microservice systems; and managing, through a distributed key-value storage mechanism, the activity data uniformly across the plurality of microservice systems according to duration of the activity data stored in the first preset database and/or a management operation of a user for the activity data;

wherein the first preset database is a key-value database that meets a first preset storage performance standard, wherein in accordance with a determination that the management operation for the activity data is an activity data deletion operation, the method further comprises:

asynchronously, deleting activity data to be deleted associated with the activity data deletion operation in a data storage space of a first microservice business system that generates the activity data to be deleted; and sending a data deletion request to a business-related microservice business system that stores the activity data to be deleted other than the first microservice business system, so that the business-related microservice business system deletes the activity data to be deleted stored in the corresponding data storage space according to the data deletion request.

2. The method of claim 1, wherein managing the activity data according to duration of the activity data stored in the first preset database comprises:

in accordance with a determination that the duration of the activity data stored in the first preset database exceeds a preset hot data storage duration threshold, transferring the activity data from the first preset database to a corresponding second preset database;

wherein the second preset database is a distributed table storage database that meets a second preset storage performance standard.

3. The method of claim 1, wherein upon failure to store the activity data into the first preset database or after storing a preset quantity of the activity data, the method further comprises:

storing the activity data as new added data into an offline data storage table; and storing data in the offline data storage table into the first preset database according to a preset data storage period.

4. The method of claim 2, wherein the method further comprises:

sampling the activity data in the first preset database and the second preset database respectively according to a first preset data verification time period to obtain verification sample data; and performing consistency verification on the verification sample data.

5. The method of claim 1, wherein after performing the activity data deletion operation, the method further comprises:

searching for the activity data to be deleted in individual data storage spaces, and verifying whether the activity data to be deleted is deleted from each of the data storage spaces.

6. The method of claim 1, wherein the method further comprises:

performing consistency verification on the activity data stored in individual data storage spaces according to a second preset data verification time period, and performing consistency verification on the activity data associated with all queue messages in the preset activity data reporting event message queue and the activity data stored in individual data storage spaces.

7. An electronic device, comprising:

one or more processors;

a storage apparatus for storing one or more programs that, when executed by the one or more processors, cause the one or more processors to perform acts comprising:

obtaining, through a queue message processing component disposed in a plurality of microservice systems, a queue message in a preset activity data reporting event message queue from the plurality of microservice systems under a microservice structure, and storing activity data corresponding to the queue message into a first preset database of at least one data storage space having a business association with the activity data, the queue message including activity data from different microservice systems; and managing, through a distributed key-value storage mechanism, the activity data uniformly across the plurality of microservice systems according to duration of the activity data stored in the first preset database and/or a management operation of a user for the activity data;

wherein the first preset database is a key-value database that meets a first preset storage performance standard, wherein in accordance with a determination that the management operation for the activity data is an activity data deletion operation, the acts further comprise:

asynchronously, deleting activity data to be deleted associated with the activity data deletion operation in a data storage space of a first microservice business system that generates the activity data to be deleted; and sending a data deletion request to a business-related microservice business system that stores the activity data to be deleted other than the first microservice business system, so that the business-related microservice business system deletes the activity data to be deleted stored in the corresponding data storage space according to the data deletion request.

8. The electronic device of claim 7, wherein managing the activity data according to duration of the activity data stored in the first preset database comprises:

in accordance with a determination that the duration of the activity data stored in the first preset database exceeds a preset hot data storage duration threshold, transferring the activity data from the first preset database to a corresponding second preset database;

wherein the second preset database is a distributed table storage database that meets a second preset storage performance standard.

9. The electronic device of claim 7, wherein upon failure to store the activity data into the first preset database or after storing a preset quantity of the activity data, the acts further comprise:

storing the activity data as new added data into an offline data storage table; and storing data in the offline data storage table into the first preset database according to a preset data storage period.

10. The electronic device of claim 8, wherein the acts further comprise:

sampling the activity data in the first preset database and the second preset database respectively according to a first preset data verification time period to obtain verification sample data; and performing consistency verification on the verification sample data.

11. The electronic device of claim 7, wherein after performing the activity data deletion operation, the acts further comprise:

searching for the activity data to be deleted in individual data storage spaces, and verifying whether the activity data to be deleted is deleted from each of the data storage spaces.

12. The electronic device of claim 7, wherein the acts further comprise:

performing consistency verification on the activity data stored in individual data storage spaces according to a second preset data verification time period, and performing consistency verification on the activity data associated with all queue messages in the preset activity data reporting event message queue and the activity data stored in individual data storage spaces.

13. A non-transitory computer readable storage medium having a computer program stored thereon, wherein the computer program, when executed by a processor, performs acts comprising:

obtaining, through a queue message processing component disposed in a plurality of microservice systems, a queue message in a preset activity data reporting event message queue from the plurality of microservice systems under a microservice structure, and storing activity data corresponding to the queue message into a first preset database of at least one data storage space having a business association with the activity data, the queue message including activity data from different microservice systems; and managing, through a distributed key-value storage mechanism, the activity data uniformly across the plurality of microservice systems according to duration of the activity data stored in the first preset database and/or a management operation of a user for the activity data;

wherein the first preset database is a key-value database that meets a first preset storage performance standard, wherein in accordance with a determination that the management operation for the activity data is an activity data deletion operation, the acts further comprise:

asynchronously, deleting activity data to be deleted associated with the activity data deletion operation in a data storage space of a first microservice business system that generates the activity data to be deleted; and sending a data deletion request to a business-related microservice business system that stores the activity data to be deleted other than the first microservice business system, so that the business-related microservice business system deletes the activity data to be deleted stored in the corresponding data storage space according to the data deletion request.

14. The non-transitory computer readable storage medium of claim 13, wherein managing the activity data according to duration of the activity data stored in the first preset database comprises:

in accordance with a determination that the duration of the activity data stored in the first preset database exceeds a preset hot data storage duration threshold, transferring the activity data from the first preset database to a corresponding second preset database;

wherein the second preset database is a distributed table storage database that meets a second preset storage performance standard.

15. The non-transitory computer readable storage medium of claim 13, wherein upon failure to store the activity data into the first preset database or after storing a preset quantity of the activity data, the acts further comprise:

storing the activity data as new added data into an offline data storage table; and storing data in the offline data storage table into the first preset database according to a preset data storage period.

16. The non-transitory computer readable storage medium of claim 14, wherein the acts further comprise:

sampling the activity data in the first preset database and the second preset database respectively according to a first preset data verification time period to obtain verification sample data; and performing consistency verification on the verification sample data.

17. The non-transitory computer readable storage medium of claim 13, wherein after performing the activity data deletion operation, the acts further comprise:

searching for the activity data to be deleted in individual data storage spaces, and verifying whether the activity data to be deleted is deleted from each of the data storage spaces.

18. The method of claim 1, wherein in accordance with a determination that the management operation for the activity data is an activity data query operation, the method further comprises:

in response to an activity data query operation instruction, querying target query activity data within a preset historical duration associated with an initiation time of the query instruction, filtering and ranking the target query activity data, and feeding back processing results in pages to the user.

* * * * *